L. FRENNET.
CHEMICAL MANURE DISTRIBUTER.
APPLICATION FILED FEB. 5, 1910.

977,290.

Patented Nov. 29, 1910.
2 SHEETS—SHEET 1.

L. FRENNET.
CHEMICAL MANURE DISTRIBUTER.
APPLICATION FILED FEB. 5, 1910.

977,290.

Patented Nov. 29, 1910.
2 SHEETS—SHEET 2.

Witnesses.
Inventor,
Louis Frennet,
per
attorney

UNITED STATES PATENT OFFICE.

LOUIS FRENNET, OF LIGNY, BELGIUM.

CHEMICAL-MANURE DISTRIBUTER.

977,290.  Specification of Letters Patent.  Patented Nov. 29, 1910.

Application filed February 5, 1910. Serial No. 542,254.

*To all whom it may concern:*

Be it known that I, LOUIS FRENNET, a subject of the Belgian King, and residing at Ligny, Belgium, have invented new and useful Improvements in Chemical-Manure Distributers; and I do hereby declare the following to be a full, clear, and exact description of the same.

My present invention relates to chemical manure distributers and has for its object to provide a distributer of this kind, wherein the manure to be distributed upon the ground is contained in a suitable container having a segmental movable bottom, adapted to be swung to the right and the left, for the purpose of discharging the manure by the swinging movements of said bottom alternately at each side upon a distributing sieve, which distributes the manure uniformly upon the ground.

My invention consists in the combination and arrangement of parts, fully described hereinafter and specifically pointed out in the appended claims.

Figure 1:
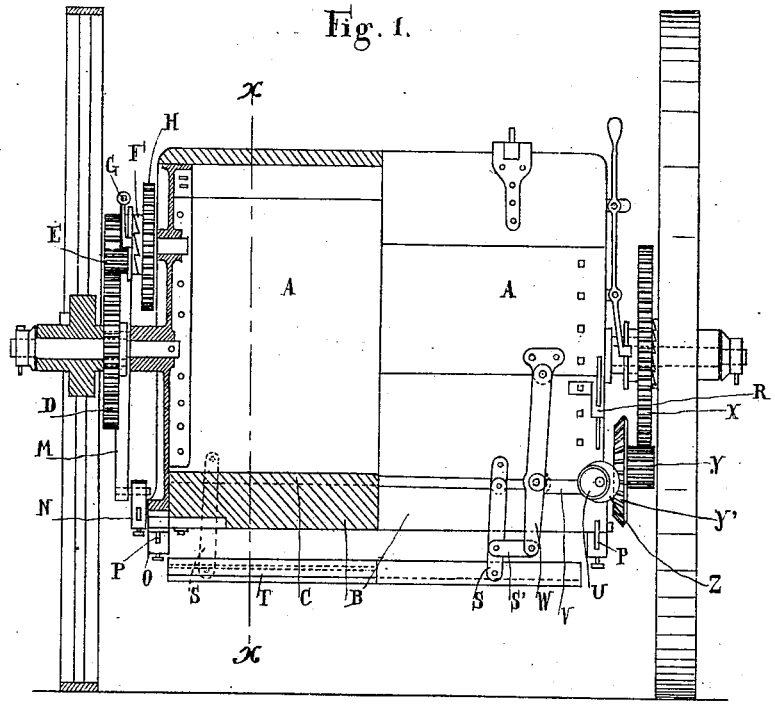
Figure 4:
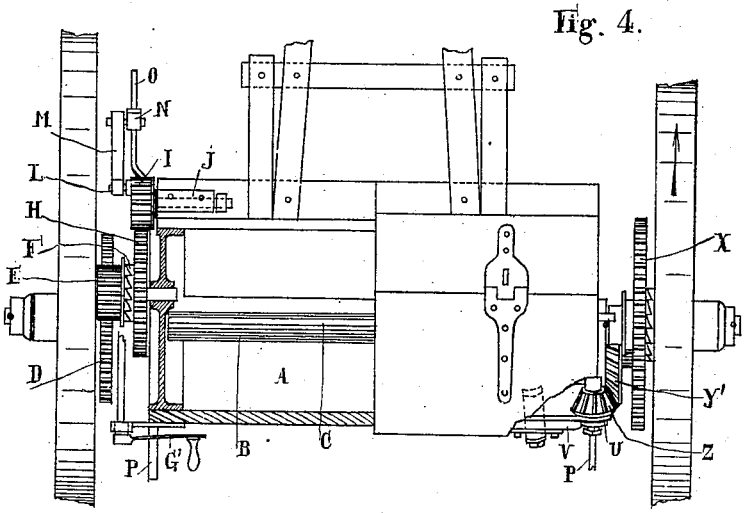
Figure 2:
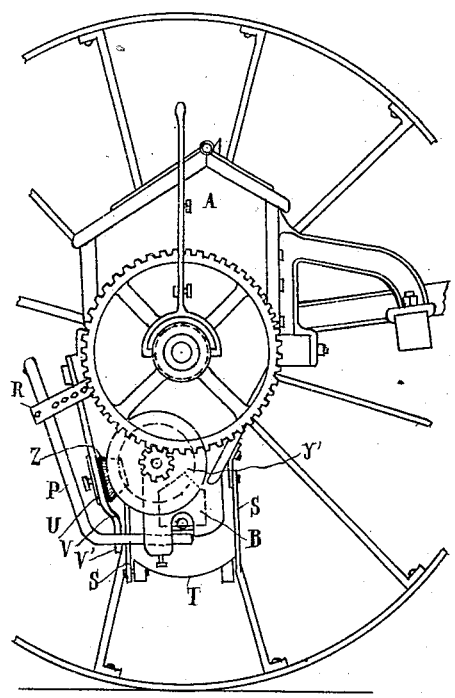
Figure 3:
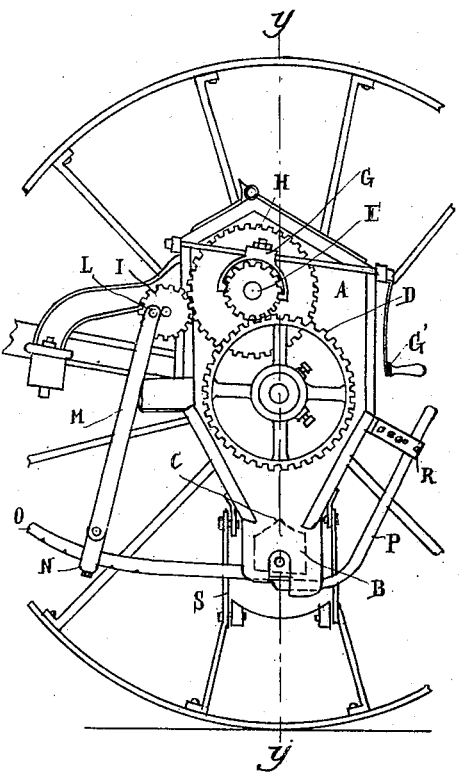
Figure 5:
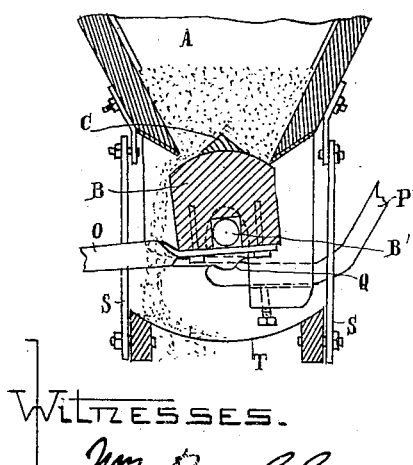
Figure 6:
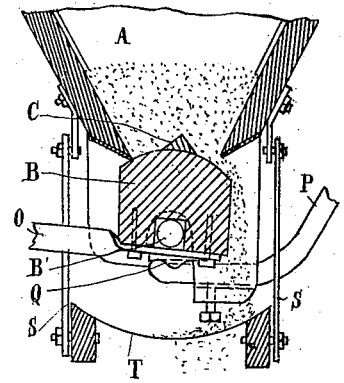

In the accompanying drawings, Figure 1 shows at the right hand in rear elevation the distributer and at the left a vertical cross-section on line $y$—$y$ of Fig. 3; Fig. 2 is a side elevation taken from the right of Fig. 1; Fig. 3 is a side elevation from the left of Fig. 1; Fig. 4 shows at the right hand the top plan view and at the left hand a horizontal cross-section of the distributer; Fig. 5 is a sectional view on line $x$—$x$ of Fig. 1 of the distributing member of the machine, in a position for distributing manure to the front side; and Fig. 6 is a similar view, the distributing member being in a position for discharging manure to the rear side.

Referring to the drawings, A represents any suitable box-like receptacle or container, which is normally closed at the bottom by a segmental member B, journaled on pivot-pins B', B' and adapted to be swung to the right and to the left. Said member is provided at its upper curved surface with a longitudinal wedge-shaped projection C, serving to push the manure to the lateral discharge openings formed at each swinging movement of the member B. The receptacle A is supported on wheels, to one of which is attached a gear-wheel D, meshing with a pinion E, made integral with a ratchet-wheel F engaged by a pawl G actuated by a lever G'.

In order to actuate the distributing member B, the loosely mounted toothed pinion E is coupled by means of the pawl G engaging the ratchet F with a second toothed wheel H meshing with a toothed pinion I, mounted on the end of a stud-shaft J and provided with an eccentric crank-pin L, to which is connected a crank M, the lower end of which is suitably connected to a sleeve N adjustably secured on a lever O extending from and attached to the distributing member B. Owing to this adjustable connection between the crank M and the lever O, the swinging movements of the member B and therefore the quantity of manure distributed at each movement may be varied as desired. Said member B is provided with two upwardly extending arms P, P, the lower ends of which carry the bearings Q for the pivot-pins B', B', while the upper ends of said arms are adjustably held in guide-parts R, for the purpose of enabling the member to be adjusted vertically according to the quantity and nature of manure to be distributed.

Arranged below the member B is a sieve T supported on rods or springs S attached to the box A. The manure discharged from the box A by the swinging member B drops upon said sieve, which spreads it upon the ground. To this end, a shaking movement is imparted to said sieve through the agency of an eccentric U, connected by a bar V to a lever W, actuating through a link S' one of the aforesaid rods S. Said eccentric U is actuated by a gear-wheel X attached to the hub of the ground-wheel of the machine and meshing with a pinion Y made integral with a bevel gear-wheel Y' meshing with a bevel gear-wheel Z mounted on the shaft of the eccentric U.

Many changes may of course be made in the minor details of construction of the distributer herein described and shown, without departing from the scope of my invention.

Having fully described my invention, what I claim and desire to secure by Letters Patent is:—

1. The combination of a receptacle for the material to be discharged, said receptacle having a downward discharge opening, an oscillating member having oppositely inclined upper faces and movable transversely of and within said opening from and substantially to each of opposite sides of said opening, and means for imparting oscillating movement to said member, substantially as described.

2. The combination of a receptacle for the material to be discharged, said receptacle having a downward discharge opening, supporting means for said receptacle comprising ground wheels, an oscillating member having oppositely inclined upper faces and pivoted to move transversely of and within said opening from and substantially to each of opposite sides of said opening, an arm extending from and rigidly attached to said member, an adjustable power-transmitting means operatively connecting the ground wheel with said arm, substantially as described.

3. The combination of a receptacle for the material to be discharged, said receptacle having a downward discharge opening, an oscillating member having oppositely inclined upper faces and movable transversely of and within said opening from and substantially to each of opposite sides of said opening, means for imparting oscillating movement to said member, and means, adjustable vertically, for supporting said member, substantially as described.

4. The combination of a receptacle for the material to be discharged, said receptacle having a downward discharge opening, an oscillating member having oppositely inclined upper faces and movable transversely of and within said opening from and substantially to each of opposite sides of said opening, means for imparting oscillating movement to said member, a sieve arranged under said member and means for oscillating said sieve, substantially as described.

In testimony whereof, I have signed my name to this specification in the presence of two subscribing witnesses.

LOUIS FRENNET.

Witnesses:
P. DUNKEL,
GREGORY PHELAN.